(12) United States Patent
Liu et al.

(10) Patent No.: US 11,165,705 B2
(45) Date of Patent: Nov. 2, 2021

(54) DATA TRANSMISSION METHOD, DEVICE, AND COMPUTER STORAGE MEDIUM

(71) Applicant: HUAWEI TECHNOLOGIES CO., LTD., Guangdong (CN)

(72) Inventors: Xiaoli Liu, Shenzhen (CN); Nongda Hu, Beijing (CN); Zheng Cao, Shenzhen (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 0 days.

(21) Appl. No.: 16/856,951

(22) Filed: Apr. 23, 2020

(65) Prior Publication Data
US 2020/0252337 A1 Aug. 6, 2020

Related U.S. Application Data

(63) Continuation of application No. PCT/CN2018/111632, filed on Oct. 24, 2018.

(30) Foreign Application Priority Data

Oct. 25, 2017 (CN) .......................... 201711010402.X (51) Int. Cl.
*H04L 12/801* (2013.01)
*H04L 12/26* (2006.01)
(Continued)

(52) U.S. Cl.
CPC .......... *H04L 47/12* (2013.01); *H04L 43/0805* (2013.01); *H04L 43/0876* (2013.01); *H04L 47/30* (2013.01); *H04L 47/58* (2013.01)

(58) Field of Classification Search
CPC ........... H04L 43/08–0894; H04L 47/10; H04L 47/11–115; H04L 47/12–127; H04L 47/30; H04L 47/58
See application file for complete search history.

(56) References Cited

U.S. PATENT DOCUMENTS 7,668,103 B1 * 2/2010 Pannell .................. H04L 47/26
370/237
2009/0296670 A1 * 12/2009 Luo .......................... H04L 47/35
370/338
(Continued)

FOREIGN PATENT DOCUMENTS

CN 101030926 A 9/2007
CN 102546098 A 7/2012
(Continued)

OTHER PUBLICATIONS

Nan Jiang et al. Network Congestion Avoidance Through Speculative Reservation, 2011 IEEE. Total 12 pages.

*Primary Examiner* — Chi H Pham
*Assistant Examiner* — Vladislav Y Agureyev
(74) *Attorney, Agent, or Firm* — Womble Bond Dickinson (US) LLP (57) ABSTRACT

Embodiments of the invention disclose a data transmission method, a device, and a computer storage medium to perform data transmission. A congestion status of a transmission port is obtained by a first device. The transmission port is a communications port used by the first device when a second device transmits data to the first device. The congestion status is used to indicate whether data congestion occurs on the transmission port. Indication information is sent to the second device when a mode switching condition is met. The indication information is used to instruct the second device to switch a transmission mode used when the second device transmits the data, so that the second device transmits the data to the first device in a switched transmission mode, and the mode switching condition is associated with the congestion status of the transmission port.

16 Claims, 8 Drawing Sheets

(51) Int. Cl.
*H04L 12/835* (2013.01)
*H04L 12/869* (2013.01)

(56) References Cited

U.S. PATENT DOCUMENTS

| | | |
|---|---|---|
| 2013/0215733 A1 | 8/2013 | Jiang et al. |
| 2013/0343362 A1* | 12/2013 | Huang ............... H04W 72/0446 |
| | | 370/336 |
| 2014/0164641 A1 | 6/2014 | Ye et al. |
| 2015/0281126 A1 | 10/2015 | Regula et al. |
| 2016/0154756 A1* | 6/2016 | Dodson ............... G06F 13/4022 |
| | | 710/316 |
| 2018/0205656 A1* | 7/2018 | Atli ........................ H04L 47/11 |

FOREIGN PATENT DOCUMENTS

| | | |
|---|---|---|
| CN | 104270320 A | 1/2015 |
| CN | 106134138 A | 11/2016 |
| CN | 107171969 A | 9/2017 |
| WO | 2016086385 A1 | 6/2016 |

\* cited by examiner

DATA TRANSMISSION METHOD, DEVICE, AND COMPUTER STORAGE MEDIUM

CROSS-REFERENCE TO RELATED APPLICATIONS

This application is a continuation of International Application No. PCT/CN2018/111632, filed on Oct. 24, 2018, which claims priority to Chinese Patent Application No. 201711010402.X, filed on Oct. 25, 2017. The disclosures of the aforementioned applications are hereby incorporated by reference in their entireties.

TECHNICAL FIELD

Embodiments of the invention relate to the field of communications technologies, and in particular, to a data transmission method, a device, and a computer storage medium.

BACKGROUND

Figure 1:
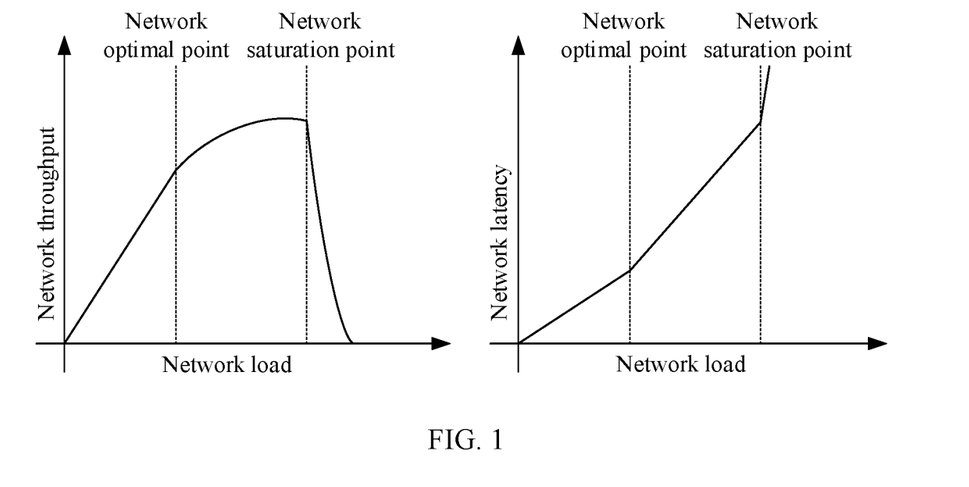
FIG. 1 is a schematic diagram of network performance indicators.

A data center network (DCN) is a network applied in a data center, and is required to meet requirements of a high throughput and a low latency. However, the throughput and latency are two mutually constrained indicators of the network. FIG. 1 is a schematic diagram of impact of network load on each of the throughput and the latency. As shown in FIG. 1, when the network load is less than a network saturation point, the network throughput increases as the load increases, and the latency also increases. When the network load is greater than the network saturation point, the network throughput decreases rapidly as the load increases, and correspondingly, the latency increases rapidly. A purpose of data transmission (e.g., network traffic) control in the DCN is to have both a relatively large throughput and a relatively small latency.

In the prior art, two solutions are proposed for implementing the data transmission control. A first solution is a data transmission method based on passive flow control. Specifically, a source node pushes data to a destination node in an active push manner. When the network is congested, the source node starts to restrict sending data to the destination node after receiving a feedback. In this method, a latency is lower. However, data transmission can be controlled only after the network is congested. A throughput decreases, and a packet loss easily occurs.

A second solution is a data transmission method based on active flow control. Specifically, a source node sends data to a destination node in a pull manner. "Pull" means that before sending the data to the destination node, the source node needs to request from the destination node a data volume that can be sent, and the destination node feeds back to the source node a data volume that can be sent. "Push" means that after receiving the data volume fed back by the destination node, the source node may send the data to the destination node based on the granted data volume. In this method, there is a request-response negotiation process for "pull", increasing the network latency. Therefore, a proper data transmission control solution needs to be provided.

SUMMARY

Embodiments of the invention disclose a data transmission method, a device, and a computer storage medium, so that both a high throughput and a low latency of a network can be implemented.

An embodiment of the invention provides a data transmission method, where the method includes:

obtaining, by a first device, a congestion status of a transmission port, where the transmission port is a communications port used by the first device when a second device transmits data to the first device, and the congestion status is used to indicate whether data congestion occurs on the transmission port; and sending indication information to the second device when a mode switching condition is met, where the indication information is used to instruct the second device to switch a transmission mode used when the second device transmits the data, so that the second device transmits the data to the first device in a switched transmission mode, and the mode switching condition is associated with the congestion status of the transmission port.

In some possible embodiments, the mode switching condition is a first condition or a second condition, where the first condition includes: the congestion status is used to indicate that data congestion occurs on the transmission port, and a transmission mode prestored in the first device is a first mode, where the first mode is used to instruct the second device to transmit the data to the first device in a push manner; and the second condition includes: the congestion status is used to indicate that data congestion does not occur on the transmission port, and a transmission mode prestored in the first device is a second mode, where the second mode is used to instruct the second device to transmit the data to the first device in a pull manner.

In some possible embodiments, if the mode switching condition is the first condition, the indication information is used to instruct the second device to switch the transmission mode from the first mode to the second mode, to transmit the data to the first device in the pull manner indicated in the second mode; or if the mode switching condition is the second condition, the indication information is used to instruct the second device to switch the transmission mode from the second mode to the first mode, to transmit the data to the first device in the push manner indicated in the first mode.

In some possible embodiments, the congestion status of the transmission port is determined based on a length of a data queue at the transmission port.

In some possible embodiments, the congestion status of the transmission port is determined based on a transmission rate of the data queue and a length, collected at a first sampling instant, of the data queue, the transmission rate of the data queue is determined based on the length, collected at the first sampling instant, of the data queue and a length, collected at a second sampling instant, of the data queue, and the second sampling instant takes precedence over the first sampling instant.

In some possible embodiments, the method further includes: synchronously updating the transmission mode prestored in the first device.

In some possible embodiments, the method further includes: recording mode identification information when there are a plurality of second devices, where the mode identification information includes identification information corresponding to a transmission mode used when each of the plurality of second devices performs data transmission with the first device, so that the first device learns, based on the mode identification information, whether the indication information has been sent to a target device currently, and the target device is a device in the plurality of second devices.

An embodiment of the invention provides a data transmission method, where the method includes:

receiving indication information sent by a first device, where the indication information is used to instruct a second device to switch a transmission mode used when data is transmitted to the first device, the indication information is sent by the first device when it is determined that a mode switching condition is met, the mode switching condition is associated with a congestion status of a transmission port, the transmission port is a communications port used by the first device when the second device transmits the data to the first device, and the congestion status is used to indicate whether data congestion occurs on the transmission port; and transmitting the data to the first device in a switched transmission mode according to the instruction of the indication information.

In some possible embodiments, the mode switching condition is a first condition or a second condition, where the first condition includes: the congestion status is used to indicate that data congestion occurs on the transmission port, and a transmission mode prestored in the first device is a first mode, where the first mode is used to instruct the second device to transmit the data to the first device in a push manner; and the second condition includes: the congestion status is used to indicate that data congestion does not occur on the transmission port, and a transmission mode prestored in the first device is a second mode, where the second mode is used to instruct the second device to transmit the data to the first device in a pull manner.

In some possible embodiments, if the mode switching condition is the first condition, the indication information is used to instruct the second device to switch the transmission mode from the first mode to the second mode, to transmit the data to the first device in the pull manner indicated in the second mode; or if the mode switching condition is the second condition, the indication information is used to instruct the second device to switch the transmission mode from the second mode to the first mode, to transmit the data to the first device in the push manner indicated in the first mode.

In some possible embodiments, the method further includes: synchronously updating the transmission mode prestored in the second device.

An embodiment of the invention provides a network device, including a functional unit configured to perform the method according to embodiments as described herein.

An embodiment of the invention provides a network device, including a functional unit configured to perform the method according to embodiments as described herein.

An embodiment of the invention provides a network device, including a memory, a communications interface, and a processor coupled to the memory and the communications interface, where the memory is configured to store an instruction, the processor is configured to execute the instruction, the communications interface is configured to communicate with another device under control of the processor, and when executing the instruction, the processor performs the method according to embodiments as described herein.

An embodiment of the invention provides a network device, including a memory, a communications interface, and a processor coupled to the memory and the communications interface, where the memory is configured to store an instruction, the processor is configured to execute the instruction, the communications interface is configured to communicate with another device under control of the processor, and when executing the instruction, the processor performs the method according to embodiments as described herein.

In at least one embodiment, a computer readable storage medium is provided, where the computer readable storage medium stores program code used for mail transfer, and the program code includes an instruction used to perform the method according to embodiments as described herein.

In at least one embodiment, a computer readable storage medium is provided, where the computer readable storage medium stores program code used for mail transfer, and the program code includes an instruction used to perform the method according to embodiments as described herein.

In at least one embodiment, a computer program product including an instruction is provided, and when the computer program product runs on a computer, the computer performs the method according to embodiments as described herein.

In at least one embodiment, a computer program product including an instruction is provided, and when the computer program product runs on a computer, the computer performs the method according to embodiments as described herein.

Performance of both a high throughput and a low latency of a network can be implemented by using the embodiments of the invention.

BRIEF DESCRIPTION OF DRAWINGS

To describe the technical solutions in the embodiments of the invention or in the prior art more clearly, the following briefly describes the accompanying drawings required for describing the embodiments or the prior art.

DESCRIPTION OF EMBODIMENTS

The following describes the technical solutions in the embodiments of the invention in detail with reference to the accompanying drawings.

It is found that a goal of a DCN network is to meet the requirements of both a high throughput and a low latency. In the prior art, to achieve the goal of the DCN, common flow control (e.g., data transmission control) methods include active flow control and passive flow control. When a flow control method is applied to a network device (e.g., a network intermediate device such as a router), a first network indicator to be pursued is a high throughput, and a case such as a packet loss due to network congestion is not allowed. In this case, the flow control method used by the network device is the active flow control method. In at least one embodiment, the following two solutions exist.

Solution 1

Figure 2:
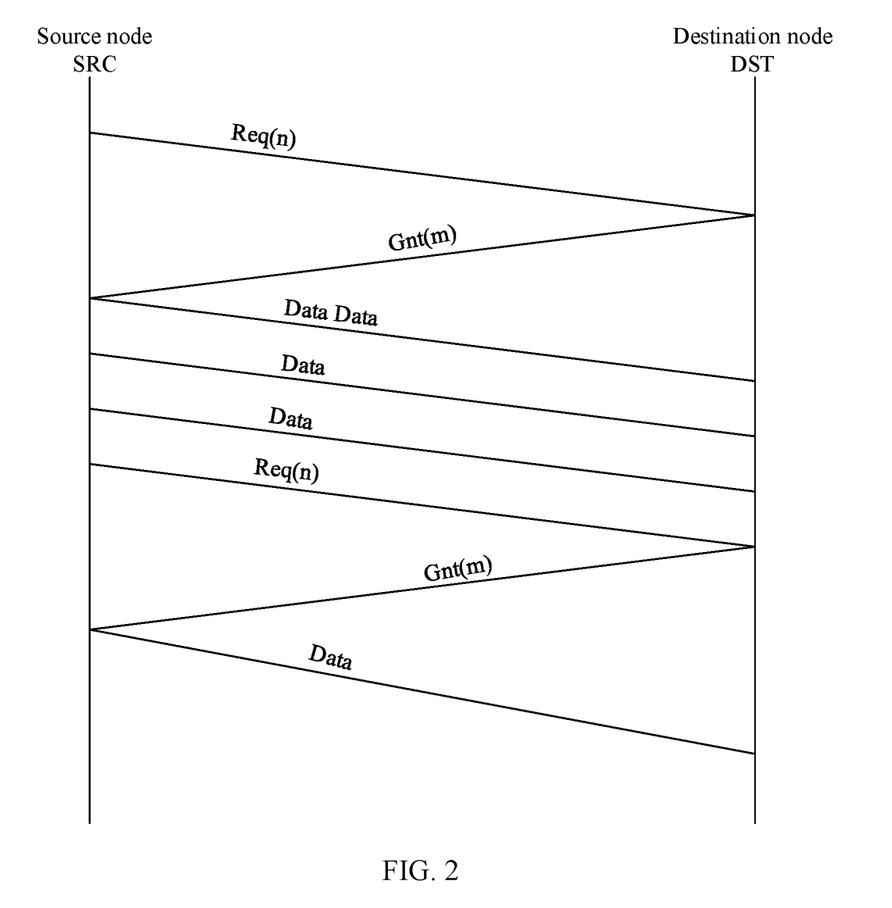
FIG. 2 is a schematic diagram of a scenario of active flow control.

As shown in FIG. 2, before transmitting data to a destination node, a source node needs to send a request packet request (shown as req) to the destination node, and the request packet carries a data volume that the source node requests to send. After receiving the request packet, the destination node may determine, based on a buffer capacity of a buffer and/or a network rate that are of the destination node, a data volume that can be granted to each source node (e.g., an amount of data that can be sent), and encapsulate the granted data volume in a grant response packet (shown as Gnt) and feed back the granted data volume to the corresponding source node. Correspondingly, when receiving the granted data volume fed back by the destination node, the source node may start to send data to the destination node, and a data volume that has been sent and a remaining available data volume may be counted by using a data volume register. Correspondingly, when the available data volume is less than a threshold, the source node may send a request packet to the destination node again, and update a received granted data volume fed back by the destination node to the data volume register. This process is performed repeatedly, so that the source node is capable of sending the data to the destination node without causing congestion. However, a preliminary negotiation process needs to be performed before the data is sent, increasing the network latency. To resolve this problem, a second solution is proposed.

Solution 2

Figure 3A:
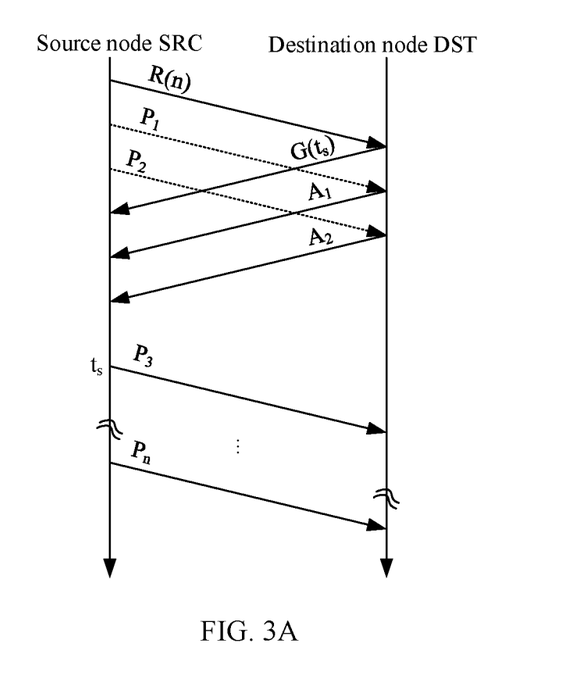
FIG. 3A and FIG. 3B are schematic diagrams of other two scenarios of active flow control.
Figure 3B:
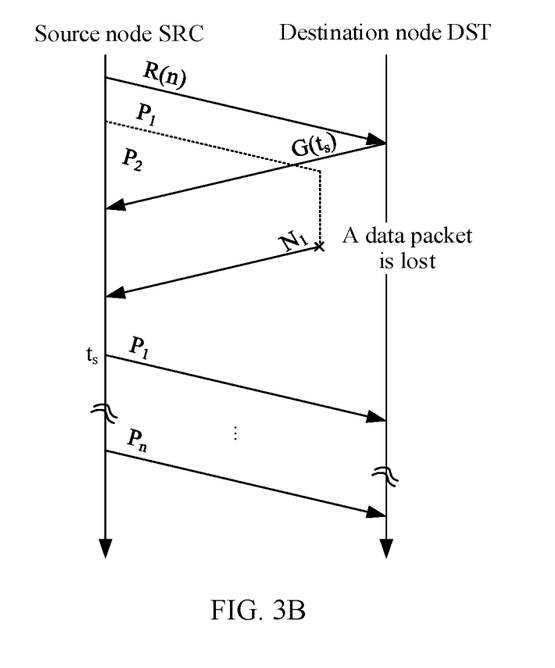

Network Congestion Avoidance Through Speculative Reservation (SRP) is an active flow control protocol proposed for the DCN, and network congestion can be prevented through negotiation for reserving resources on a source node and a destination node. In at least one embodiment, FIG. 3A and FIG. 3B are schematic diagrams of sending and receiving scenarios of the SPR protocol. FIG. 3A is a schematic diagram of sending and receiving in data transmission when congestion does not occur, and FIG. 3B is a schematic diagram of sending and receiving in data transmission when congestion occurs. In the figures, R(n) represents a resource request packet with a high priority, and n represents a quantity that is of data packets to be sent and that is to be applied for (e.g., an applied data volume).

As shown in FIG. 3A, when sending data to the destination node, the source node first needs to send the request packet R(n) to the destination node, and simultaneously starts to push data packets, which are data packets $P_1$ and $P_2$ in FIG. 3A. During data packet pushing, a packet loss may occur due to network congestion. Therefore, when the pushed data packet arrives at the destination node, the destination node needs to feed back a grant packet $G(t_s)$, where $t_s$ specifies a time when the source node starts to send packets. Correspondingly, after receiving the grant packet $G(t_s)$, the source node stops pushing the data packets, and starts to push n data packets, which are $P_3$ to $P_n$ shown in the figure, to the destination node from $t_s$. After the request packet R(n) is sent, this process is repeated. Particularly, as shown in FIG. 3B, when network congestion occurs, a data packet is lost in the network in a sending process, and the destination node needs to correspondingly return a NACK response packet (shown as Ni) to the source node. Correspondingly, after receiving the NACK response packet Ni, the source node stops pushing data packets to the destination node. The source node waits until a granted time $t_s$ returned by the destination node, and starts to send n data packets from the lost data packet, which are $P_1$ to $P_n$ shown in the figure, to the destination node.

In practice, it is found that although some data is pushed in the request process to compensate for a bandwidth loss and a latency that are caused by the request, performance advantages of the active flow control are not fully utilized, and a network latency is still relatively high.

To resolve the foregoing problem, this application proposes a solution of switching between the active flow control and the passive flow control, to fully utilize performance advantages of the active flow control and the passive flow control and implement performance of both a high throughput and a low latency.

Figure 4:
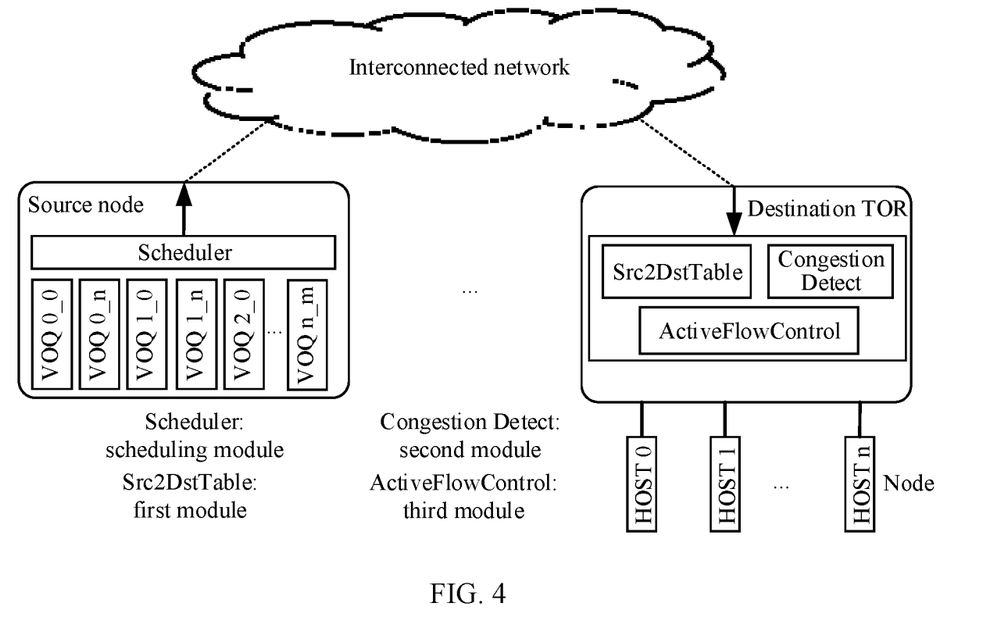
FIG. 4 is a schematic diagram of a network framework according to an embodiment of the invention.

First, FIG. 4 is a schematic diagram of a network architecture applicable to an embodiment of the invention. As shown in FIG. 4, the network architecture in the schematic diagram includes a source node and destination nodes. Optionally, the network architecture in the schematic diagram may further include an intermediate node. Quantities of various nodes are not limited in the application. For example, the figure shows one source nodes, one intermediate node, and n destination nodes, where n is a positive integer.

In an optional embodiment, the destination node may also be an intermediate node, and the intermediate node includes but is not limited to a network device and a terminal device. The network device may be an intermediate device such as a router or a switch, or may be an endpoint device such as a network adapter. The terminal device includes but is not limited to an Internet device such as a user terminal, a smartphone (such as an Android mobile phone or an IOS mobile phone), a personal computer, a tablet, a palmtop computer, a mobile Internet device (MID), or a wearable intelligent device. This is not limited in this application. The source node may alternatively be a network device or a terminal device, and this is not limited in the application.

In an optional embodiment, on a source node side, data is processed based on a queue mechanism. The source node side may establish an independent virtual input/output queue (VOQ) based on a destination node (or a last level switching device) at which data arrives. As shown in FIG. 4, a switch TOR is connected to n host servers, and each VOQ corresponds to one or more host servers. In at least one embodiment, when resources are sufficient, a VOQ may be statically created based on a destination host. In at least one embodiment, one VOQ corresponds to one host. Correspondingly, when resources are not sufficient, it is not possible that one source node communicates with all nodes simultaneously according to a characteristic of communication locality. Therefore, a VOQ may be dynamically created according to a requirement. In at least one embodiment, one VOQ may correspond to a plurality of hosts.

In an actual application, when sending data to a destination host through the switch TOR, the source node first stores the data in a VOQ, and then sends a data packet (which may alternatively be a request packet) to the TOR. Correspondingly, the TOR may receive data packets (or request packets) sent by a plurality of source nodes. Particularly, when the data packet is a request packet (e.g., in an active flow control mode), the TOR may feed back, based on a buffer capacity of a buffer and a network rate that are of the TOR, a corresponding granted data volume to the source node. It should be understood that the TOR may receive a data packet sent by each source node. However, due to a limited transmission rate between the TOR and the host of the TOR, data packets may gradually accumulate in the buffer of the TOR, and the advantages of the active flow control mode are not fully utilized.

To resolve the foregoing problem, as shown in FIG. 4, a scheduling module is disposed on a source node side according to one embodiment. The scheduling module is configured to match and schedule data based on a transmission mode sent by the destination node, to send the data to the destination node. The transmission mode is a mode used when data transmission is performed between the source node and the destination node. The mode includes but is not limited to a first mode (e.g., a passive flow control mode) and a second mode (e.g., the active flow control mode).

Three function modules are disposed on the destination node (or the intermediate node) side: a first module, a second module, and a third module. In at least one embodiment, the first module (e.g., a Src2DstTable function module) is configured to receive a data packet sent by the source node, establish a mapping relationship between the source node and the destination node, and store the mapping relationship, for example, store the mapping relationship in the Src2DstTable. There may be a plurality of destination nodes, for example, all the destination hosts connected to the same intermediate node TOR.

In an optional embodiment, the first module may further record the transmission mode used when data transmission is performed between the source node and the destination node. For the transmission mode, refer to related descriptions in the foregoing embodiments. Details are not described herein again.

In an optional embodiment, the first module may further record mode identification information, where the mode identification information is used to indicate that the first device has sent, to the second device, indication information used to instruct the second device to switch the transmission mode to the second mode. In at least one embodiment, the transmission mode includes the first mode and the second mode, and the mode identification information may be represented in a form of a preset string, a preset character, or the like. For example, when the mode identification information is "0", it indicates that the first device has sent, to the second device, indication information that instructs the second device to switch the transmission mode from the first mode to the second mode. Correspondingly, when the mode identification information is "1", it indicates that the first device has sent, to the second device, indication information that instructs the second device to switch the transmission mode from the second mode to the first mode. Detailed descriptions are provided below.

The second module (e.g., a CongestionDetect function module) is configured to detect or monitor a congestion status of each transmission port. The transmission port may also be referred to as a downlink port, and is a port used when the source node sends data to the destination node. Alternatively, if there is an intermediate node TOR, the transmission port is a port between the intermediate node and the destination node. The congestion status is used to indicate whether data congestion occurs on the transmission port.

The third module (e.g., an ActiveFlowControl function module) is configured to automatically adjust, based on a monitored congestion status of the transmission port, the transmission mode recorded in the first module, to implement mutual switching between transmission modes. Detailed descriptions are provided below.

Figure 5:
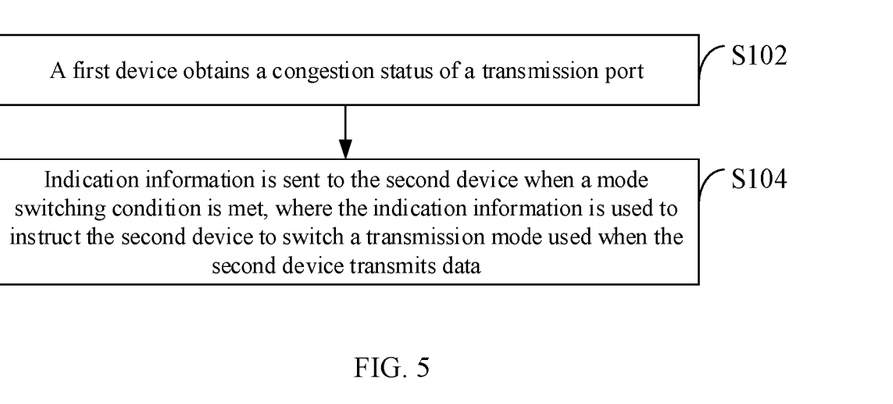
FIG. 5 is a schematic flowchart of a data transmission method according to an embodiment of the invention.

Second, based on the schematic diagram of the network framework shown in FIG. 4, the following describes method embodiments in the application. FIG. 5 is a schematic flowchart of a data transmission method according to an embodiment of the invention. As shown in FIG. 5, the method may include the following operations:

Operation S102: A first device obtains a congestion status of a transmission port, where the transmission port is a communications port used by the first device when a second device transmits data to the first device, and the congestion status is used to indicate whether data congestion occurs on the transmission port.

Operation S104: The first device sends indication information to the second device when a mode switching condition is met, where the indication information is used to instruct the second device to switch a transmission mode used when the second device transmits the data, so that the second device transmits the data to the first device in a switched transmission mode, and the mode switching condition is associated with the congestion status of the transmission port.

The transmission mode is a mode used when the second device transmits the data to the first device, and the mode includes but is not limited to a first mode (e.g., a passive flow control mode) and a second mode (e.g., an active flow control mode). The passive flow control mode means that a transmit end sends data to a receive end in a push manner, and the active flow control mode means that a transmit end sends data to a receive end in a pull manner. For the passive flow control mode and the active flow control mode, refer to related descriptions of the foregoing active flow control method and passive flow control method. Details are not described herein again.

The first device and the second device may be network devices. The first device may be an intermediate network device (such as a switch or a router), an endpoint network device (such as a network adapter), or the like, and quantities of the first device and the second device are not limited in the application. The following describes in detail related content by using an example in which the first device is an intermediate network device (e.g., a switch) according to the application.

The following describes some specific embodiments and optional embodiments in the application.

In operation S102, when the first device is an intermediate network device (for example, a switch), the second device transmits the data to a destination device by using the first device. Correspondingly, the first device may receive the data, and then forward the data to the destination device. The first device may detect a congestion status of a communications port between the first device and the destination device.

When the first device is an endpoint network device (for example, a network adapter), the second device may directly send the data to the first device, and the first device may detect the congestion status of the communications port used when the first device performs data transmission with the second device, so that the first device adjusts, based on the congestion status of the port, a transmission mode used when data transmission is performed between devices, to implement performance indicators of both a high throughput and a low latency during network data transmission.

In operation S104, the first device may determine whether the mode switching condition is currently met, and if the mode switching condition is met, the first device may send the indication information to the second device. The indication information is used to instruct the second device to switch the transmission mode of the second device to a target mode, so that the second device subsequently sends the data to the first device in the target mode. The mode switching condition is preset on a user side or a terminal device side, and the mode switching condition is associated with the congestion status of the transmission port.

In at least one embodiment, for a source node (for example, the second device) and a destination node that perform a first communication, at the beginning, the second device transmits data to the destination node (for example, a host 0) in the first mode (e.g., the passive flow control mode) by using the first device. To be specific, during network initialization, the source node and the destination node transmit data to the first device in a push manner. Optionally, on a source node (e.g., a second device) side, the second device may create and store an association relationship between the second device and a plurality of destination nodes. Optionally, the second device may further record a transmission mode used when data transmission is performed between the second device and each of the plurality of destination nodes. The plurality of destination nodes certainly include the first device. In at least one embodiment, Table 1 is a data table stored in a source node.

TABLE 1

| Source node identifier | Destination node identifier (DSTIdx) | Transmission mode (E2EFC_MODE) |
|---|---|---|
| Source node 1 (second device ID) | 0 | 0 (push mode) |
| | 1 | 0 (push mode) |
| | 2 | 0 (push mode) |
| | ... | ... |
| | n | 0 (push mode) |

Table 1 shows the source node, a plurality of destination nodes that support communication with the source node, and a transmission mode (e.g., end to end flow control, E2EFC MODE) used between the source node and each destination node. In Table 1, "0" indicates the first mode: using the push manner to transmit data to the destination node. Conversely, "1" indicates the second mode: using the pull manner to transmit data to the destination node.

Correspondingly, transmission modes used when data transmission is performed between a plurality of source nodes and the destination node (e.g., the host 0) may also be stored on a first device side. In at least one embodiment, during network initialization, a transmission mode of a transmission port of the first device is initialized to the first mode, that is, all source nodes connected to the destination node host 0 are instructed to transmit data in the push manner. The following Table 2 is a data table stored in the source node.

TABLE 2

| Destination node identifier (HOSTIdx) | Transmission mode (E2EFC_MODE) |
|---|---|
| 0 (host 0) | 0 (push mode) |
| 1 | 0 (push mode) |
| 2 | 0 (push mode) |
| ... | ... |
| n | 0 (push mode) |

It can be learned from Table 2 that, the first device records transmission modes used when data transmission is performed between each destination node and a plurality of source nodes corresponding to each destination node. Table 2 shows only a case in which the first mode "0" is used.

Figure 8:
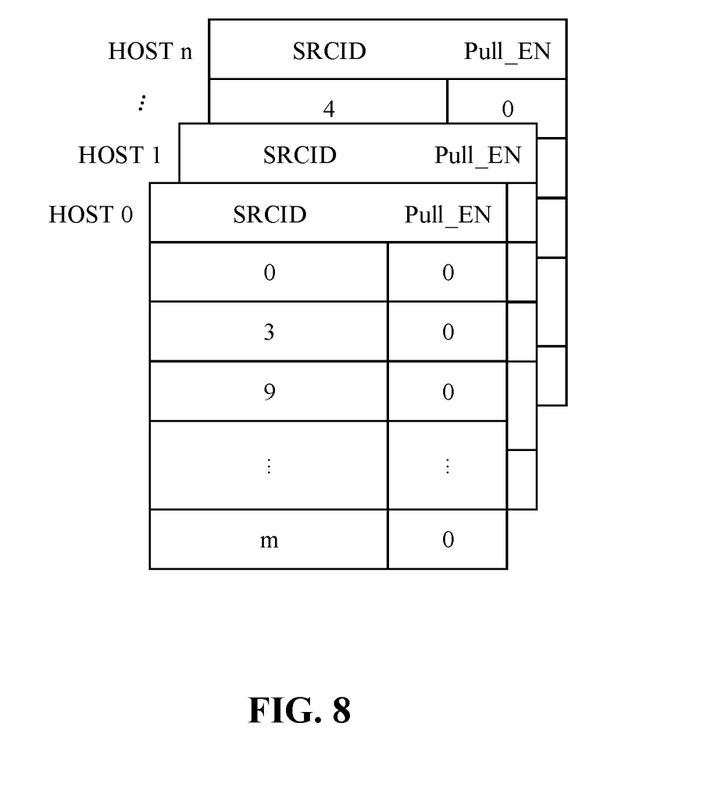
FIG. 8 is a block diagram illustrating data tables between a plurality of source nodes and a plurality of destination nodes according to an embodiment of the present invention.

In an optional embodiment, the first device may further record mode identification information corresponding to the plurality of source nodes connected to each destination node (for example, the host 0), where the mode identification information is used to indicate whether each source node has sent, to the destination node (for example, the host 0), indication information used to instruct the source node to switch the transmission mode from the first mode to the second mode. In other words, the mode identification information is used to indicate whether to switch to the second mode on the source node side to transmit data. In at least one embodiment, data tables between a plurality of source nodes and a plurality of destination nodes are shown in FIG. 8, where a data table at a top layer is mode identification information (e.g., Pull_EN) corresponding to each of a plurality of source nodes (SRCID) connected to the destination node host 0.

The host 0 is used as an example. Mode identification information corresponding to each of a source node 0, a source node 3, a source node 9, and a source node m that currently communicate with the host 0 can be learned from FIG. 8. The mode identification information is used to indicate a transmission mode used when data transmission is performed between a current source node and a destination node. Similarly, the mode identification information may also be used to determine, when mode switching occurs (in other words, a mode switching condition is met), whether the first device (or the destination node) has sent, to the plurality of source nodes that communicate with the destination node, indication information used to instruct the plurality of source nodes to switch a transmission mode.

The following describes two embodiments of operation S104.

In a first embodiment:

For all source nodes that use the first mode and a destination node, the source node sends data to the destination node in the first mode (e.g., the push manner). Correspondingly, the destination node receives the data packet and records information such as a mapping relationship between the source node and the destination node, and a transmission mode used for the data transmission. Further, a congestion status of a transmission port used when the destination node performs communication may be detected, to determine whether a mode switching condition is met. When the mode switching condition is met, indication information is sent to the second device. The mode switching condition herein may be a first condition. The first condition includes: the congestion status is used to indicate that data congestion occurs on the transmission port, and a transmission mode prestored in the first device is the first mode, where the first mode is used to instruct the second device to transmit the data to the first device in the push manner.

In at least one embodiment, an example in which the second device transmits the data to the first device in the first mode is used. The first device records the first mode used when the data transmission starts, and determines that the congestion status of the current transmission port is used to indicate whether the data congestion occurs on the transmission port. If the congestion status is used to indicate that the data congestion occurs on the transmission port, the first device sends indication information to the second device. The indication information is used to instruct the second device to switch the transmission mode from the first mode to the second mode, so that the second device subsequently transmits the data to the first device in the second mode (e.g., the pull manner). Optionally, the first device may further synchronously update the transmission mode of the second device recorded in the first device to the second mode.

If the congestion status is used to indicate that the data congestion does not occur on the transmission port, no processing is performed, and the second device still sends the data to the first device in the first mode. In this case, the process may end.

In a second embodiment:

For all source nodes that use the second mode and a destination node, the source node sends data to the destination node in the second mode (e.g., the pull manner). Correspondingly, the destination node receives the data packet and records information such as a mapping relationship between the source node and the destination node, and a transmission mode used for the data transmission. Further, a congestion status of a transmission port used when the destination node performs communication may be detected, to determine whether a mode switching condition is met. When the mode switching condition is met, indication information is sent to the second device. The mode switching condition herein may be a second condition. The second condition includes: the congestion status is used to indicate that data congestion does not occur on the transmission port, and a transmission mode prestored in the first device is the second mode, where the second mode is used to instruct the second device to transmit the data to the first device in the pull manner.

In at least one embodiment, an example in which the second device transmits the data to the first device in the second mode is used. The first device records the second mode used when the data transmission starts, and determines that the congestion status of the current transmission port is used to indicate whether the data congestion occurs on the transmission port. If the congestion status is used to indicate that the data congestion does not occur on the transmission port, the first device sends indication information to the second device. The indication information is used to instruct the second device to switch the transmission mode from the second mode to the first mode, so that the second device subsequently transmits the data to the first device in the first mode (e.g., the push manner). Optionally, the first device may further synchronously update the transmission mode of the second device recorded in the first device to the first mode.

If the congestion status is used to indicate that the data congestion occurs on the transmission port, no processing is performed, and the second device still sends the data to the first device in the second mode. In this case, the process may end.

In an optional embodiment, when the congestion status of the transmission port is used to indicate that the data congestion occurs on the transmission port, if the first device (e.g., the destination node) receives a data packet sent by a new source node in this case, the first device may further record an association relationship between the new source node and the destination node, and mode identification information is not set. In this case, the first device may send, to the second device, indication information used to instruct the second device to switch the transmission mode from the first mode to the second mode, and set the mode identification information shown as Pull_EN in Table 2, to 1.

In an optional embodiment, data transmission may be processed based on a queue mechanism, for example, a VOQ in the application. The congestion status of the transmission port depends on a length of a data queue (e.g., a VOQ) formed at the transmission port.

Figure 6:
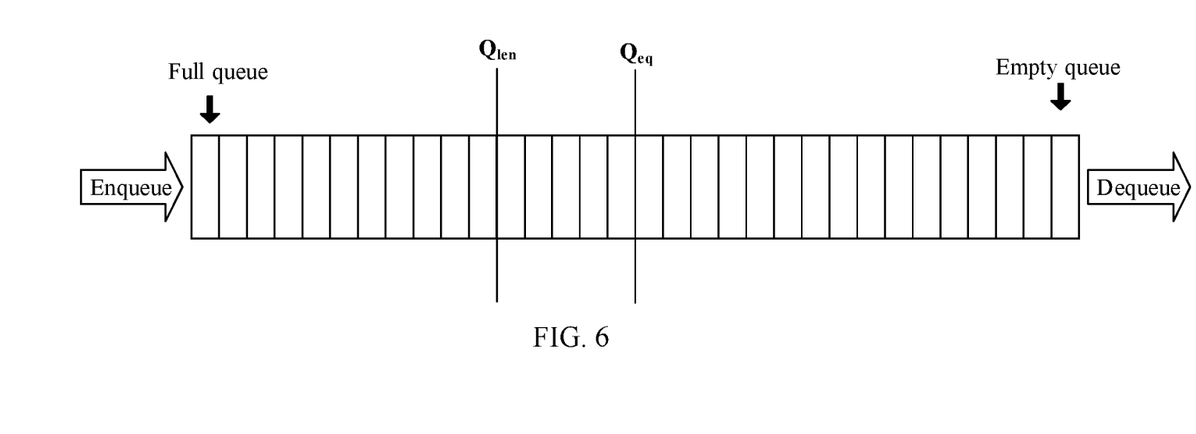
FIG. 6 is a schematic diagram of a scenario of a data queue according to an embodiment of the invention.

FIG. 6 is a schematic diagram of a scenario of a VOQ according to one embodiment. FIG. 6 shows the VOQ supported by a buffer of a device, and a first device may collect the length of the VOQ in real time or periodically. The congestion status of the transmission port is determined based on a transmission rate of a data queue and a length of the data queue at a first sampling instant (for example, a current instant). Formula (1) for calculating the congestion status of the transmission port is as follows:

Queue length offset: Qoff=Qeq−Qlen

Difference between an enqueueing rate and a dequeueing rate: Qdelta=*PKTDeQ*−*PKTEnQ*=Qlen'−−Qlen Congestion measurement: $P=\text{Qoff}+w*\text{Qdelta}$    Formula (1)

Herein, Qlen represents a length, collected by the device at a first sampling instant, of a VOQ, and Qlen' represents a length, collected by the device at a second sampling instant, of a VOQ. The first sampling instant follows the second sampling instant. For example, the first sampling instant is the current instant, and the second sampling instant is a previous sampling instant. Qeq is user-defined or device-defined, and may represent a queue balance threshold when a buffer that is full of data queues and the transmission port is close to a congested state.

Qoff represents a difference between Qlen and the set threshold Qeq. When Qoff is a negative value or a smaller value, it indicates that the transmission port is closer to the congested state (in other words, data congestion is more likely to occur). Qdelta represents a value of queue length change between two adjacent sampling intervals, reflecting the rate at which data packets are enqueued and the rate at which the data packets are dequeued. If a value of Qdelta is greater than 0, it indicates that the dequeueing rate is greater than the enqueueing rate, and data congestion is not likely to occur. If a value of Qdelta is less than 0, it indicates that the enqueueing rate is greater than the dequeueing rate, and data congestion is very likely to occur.

Correspondingly, the congestion status of the transmission port may be represented by a weighted combination of the difference between the queue length Qlen and the set threshold Qeq, and the value Qdelta of the queue length change between the two adjacent sampling intervals in the application. For details, refer to the expression of Formula (1). If P is negative, it indicates that congestion occurs on the transmission port. If P is not negative, it indicates that congestion does not occur on the transmission port.

According to the embodiments of the invention, the advantages of the active flow control mode and the passive flow control mode can be integrated, mutual switching between the modes can be automatically implemented, and performance indicators of both the high throughput and the low latency can be implemented.

It should be noted that, when there are a plurality of first devices and a plurality of second devices, that is, a plurality of source nodes and a plurality of destination nodes in the network communicate with each other, when the network is lightly loaded, the passive flow control mode (e.g., the push manner) may be used to transmit data, to provide a performance indicator of a low network latency; when the network is lightly congested, the active flow control mode (e.g., the pull manner or request negotiation) is used to transmit data between some congested source nodes and destination nodes; and when the network is heavily congested (e.g., overloaded), the active flow control mode (e.g., the pull manner or request negotiation) is used to transmit data, to provide a performance indicator of a high network throughput. For a method for adjusting a transmission mode between the source node and the destination node in each group, refer to related descriptions in the embodiment shown in FIG. 5 in the application. Details are not described herein again.

The foregoing mainly describes the solutions provided in the embodiments of the invention from perspectives of nodes and devices. It may be understood that, to implement the foregoing functions, the network device includes a corresponding hardware structure and/or software module for performing each function. With reference to units and algorithm operations of each example described in the embodiments disclosed in the application, the embodiments of the invention may be implemented in a form of hardware or a combination of hardware and computer software. Whether a function is performed by hardware or hardware driven by computer software depends on particular applications and design constraints of the technical solutions. One of ordinary skill in the art may use different methods for each particular application to implement the described functions, but it should not be construed that the implementation goes beyond the scope of the technical solutions of the embodiments of the invention.

In the embodiments of the invention, the network device may be divided into functional units based on the foregoing method examples. For example, each functional unit may be obtained through division based on a corresponding function, or two or more functions may be integrated into one processing unit. The integrated unit may be implemented in a form of hardware, or may be implemented in a form of a software functional unit. It should be noted that, unit division in the embodiments of the invention is an example, and is merely logical function division. In actual implementation, there may be another division manner.

Figure 7A:
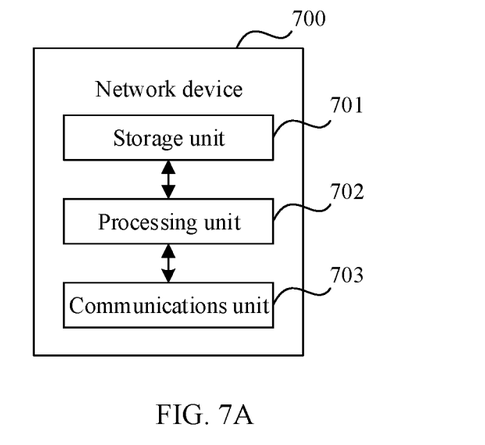
FIG. 7A is a schematic structural diagram of a network device according to an embodiment of the invention.

In a case in which an integrated unit is used, FIG. 7A is a possible schematic structural diagram of a network device in the foregoing embodiments. A network device 700 includes a processing unit 702 and a communications unit 703. The processing unit 702 is configured to control and manage operations of the network device 700. For example, the processing unit 702 is configured to support the network device 700 in performing operation S102 in FIG. 5, and/or is configured to perform another operation of the technology described in the specification. The communications unit 703 is configured to support the network device 700 in communicating with another device. For example, the communications unit 703 is configured to support the network device 700 in performing operation S104 in FIG. 5, and/or is configured to perform another operation of the technology described in the specification. The network device 700 may further include a storage unit 701 configured to store program code and data of the network device 700.

The processing unit 702 may be a processor or a controller, for example, a central processing unit (CPU), a general purpose processor, a digital signal processor (DSP), an application-specific integrated circuit (ASIC), a field programmable gate array (FPGA), or another programmable logical device, a transistor logical device, a hardware component, or any combination thereof. The processing unit 702 may implement or execute various example logical blocks, modules, and circuits described with reference to content disclosed in the application. Alternatively, the processor may be a combination implementing a computing function, for example, a combination including one or more microprocessors or a combination of a DSP and a microprocessor. The communications unit 703 may be a communications interface, a transceiver, a transceiver circuit, or the like. The communications interface is a generic term, and may include one or more interfaces, for example, an interface between a network device and another device. The storage unit 701 may be a memory.

Figure 7B:
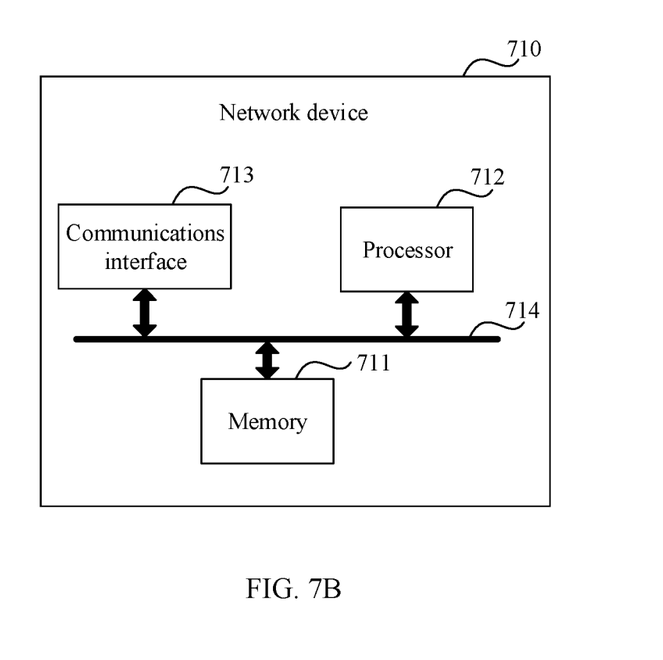
FIG. 7B is a schematic structural diagram of another network device according to an embodiment of the invention.

When the processing unit 702 is the processor, the communications unit 703 is the communications interface, and the storage unit 701 is the memory, the network device in the embodiments of the invention may be a network device shown in FIG. 7B.

As shown in FIG. 7B, a network device 710 includes a processor 712, a communications interface 713, and a memory 711. Optionally, the network device 710 may further include a bus 714. The communications interface 713, the processor 712, and the memory 77 may be connected to each other by using the bus 714. The bus 714 may be a peripheral component interconnect (Peripheral PCI) bus, an extended industry standard architecture (EISA) bus, or the like. The bus 714 may be classified into an address bus, a data bus, a control bus, and the like. For ease of representation, the bus 714 is represented by only one bold line in FIG. 7B. However, it does not mean that there is only one bus or one type of bus.

For specific implementation of the network device shown in FIG. 7A or FIG. 7B, refer to corresponding descriptions in the embodiments shown in FIG. 1 to FIG. 6. Details are not described herein again.

Methods or algorithm operations described in combination with the content disclosed in the embodiments of the invention may be implemented by hardware, or may be implemented by a processor executing a software instruction. The software instruction may be formed by a corresponding software module. The software module may be stored in a random access memory (RAM), a flash memory, a read-only memory (ROM), an erasable programmable read-only memory (EPROM), an electrically erasable programmable read-only memory (EEPROM), a register, a hard disk, a removable hard disk, a compact disc read-only memory (CD-ROM), or any storage medium in another form well-known in the art. For example, a storage medium is coupled to a processor, so that the processor can read information from the storage medium and can write information into the storage medium. Certainly, the storage medium may also be a component of the processor. The processor and the storage medium may be located in an ASIC. In addition, the ASIC may be located in a network device. Certainly, the processor and the storage medium may exist in a network device as discrete components.

One of ordinary skill in the art may understand that all or some of the processes of the methods in the embodiments may be implemented by a computer program instructing related hardware. The program may be stored in a computer readable storage medium. When the program is run, the processes of the methods in the embodiments are performed. The foregoing storage medium includes any medium such as a ROM, a RAM, a magnetic disk, or an optical disc that can store program code.

What is claimed is:

1. A data transmission method, wherein the method comprises:
   obtaining, by a first device, a congestion status of a transmission port, wherein the transmission port is a communications port used by the first device when a second device transmits data to the first device, and the congestion status is used to indicate whether data congestion occurs on the transmission port; and
   sending an indication information to the second device when a mode switching condition is met, wherein the indication information is used to instruct the second device to switch a transmission mode used when the second device transmits the data, so that the second device transmits the data to the first device in a switched transmission mode, and the mode switching condition is associated with the congestion status of the transmission port, wherein the mode switching condition comprises the congestion status and a transmission mode prestored in the first device, wherein the mode switching condition is a first condition or a second condition, wherein the first condition comprises the congestion status indicating that data congestion occurs on the transmission port, and the transmission mode is a first mode that is used to instruct the second device to transmit the data to the first device in a push manner; and wherein the second condition comprises the congestion status indicating that data congestion does not occur on the transmission port, and the transmission mode is a second mode that is used to instruct the second device to transmit the data to the first device in a pull manner.

2. The method according to claim 1, wherein if the mode switching condition is the first condition, the indication information is used to instruct the second device to switch the transmission mode from the first mode to the second mode, to transmit the data to the first device in the pull manner indicated in the second mode; or if the mode switching condition is the second condition, the indication information is used to instruct the second device to switch the transmission mode from the second mode to the first mode, to transmit the data to the first device in the push manner indicated in the first mode.

3. The method according to claim 1, wherein the congestion status of the transmission port is determined based on a length of a data queue at the transmission port.

4. The method according to claim 3, wherein the congestion status of the transmission port is determined based on a transmission rate of the data queue and the length of the data queue collected at a first sampling instant, wherein the transmission rate of the data queue is determined based on the length of the data queue collected at the first sampling instant, and the length of the data queue collected at a second sampling instant, wherein the second sampling instant takes precedence over the first sampling instant.

5. The method according to claim 1, wherein the method further comprises:

synchronously updating the transmission mode prestored in the first device.

6. The method according to claim 1, wherein the method further comprises:

recording a mode identification information, wherein the mode identification information comprises an identification information corresponding to the transmission mode used when each of a plurality of second devices performs data transmission with the first device, so that the first device learns, based on the mode identification information, whether the indication information has been sent to a target device, wherein the target device is a device in the plurality of second devices.

7. A data transmission method, wherein the method comprises:

receiving an indication information sent by a first device, wherein the indication information is used to instruct a second device to switch a transmission mode used when data is transmitted to the first device, the indication information is sent by the first device when a mode switching condition is met, the mode switching condition is associated with a congestion status of a transmission port, the transmission port is a communications port used by the first device when the second device transmits the data to the first device, and the congestion status is used to indicate whether data congestion occurs on the transmission port; and transmitting the data to the first device in a switched transmission mode according to an instruction of the indication information, wherein the mode switching condition comprises the congestion status and a transmission mode prestored in the first device, wherein the mode switching condition is a first condition or a second condition, wherein the first condition comprises the congestion status indicating that data congestion occurs on the transmission port, and the transmission mode is a first mode that is used to instruct the second device to transmit the data to the first device in a push manner; and wherein the second condition comprises the congestion status indicating that data congestion does not occur on the transmission port, and the transmission mode is a second mode that is used to instruct the second device to transmit the data to the first device in a pull manner.

8. The method according to claim 7, wherein if the mode switching condition is the first condition, the indication information is used to instruct the second device to switch the transmission mode from the first mode to the second mode, to transmit the data to the first device in the pull manner indicated in the second mode; or if the mode switching condition is the second condition, the indication information is used to instruct the second device to switch the transmission mode from the second mode to the first mode, to transmit the data to the first device in the push manner indicated in the first mode.

9. The method according to claim 7, wherein the method further comprises:

synchronously updating the transmission mode prestored in the second device.

10. A first device, wherein the first device comprises a processor and a transceiver, wherein the processor is configured to obtain a congestion status of a transmission port, wherein the transmission port is a communications port used by the first device when a second device transmits data to the first device, and the congestion status is used to indicate whether data congestion occurs on the transmission port; and wherein the transceiver is configured to send an indication information to the second device when a mode switching condition is met, wherein the indication information is used to instruct the second device to switch a transmission mode used when the second device transmits the data, so that the second device transmits the data to the first device in a switched transmission mode, and the mode switching condition is associated with the congestion status of the transmission port, wherein the mode switching condition comprises the congestion status and a transmission mode prestored in the first device, wherein the mode switching condition is a first condition or a second condition, wherein the first condition comprises the congestion status indicating that data congestion occurs on the transmission port, and the transmission mode prestored in the first device is a first mode that is used to instruct the second device to transmit the data to the first device in a push manner; and wherein the second condition comprises the congestion status indicating that data congestion does not occur on the transmission port, and the transmission mode prestored in the first device is a second mode that is used to instruct the second device to transmit the data to the first device in a pull manner.

11. The first device according to claim 10, wherein if the mode switching condition is the first condition, the indication information is used to instruct the second device to switch the transmission mode from the first mode to the second mode, to transmit the data to the first device in the pull manner indicated in the second mode; or if the mode switching condition is the second condition, the indication information is used to instruct the second device to switch the transmission mode from the second mode to the first mode, to transmit the data to the first device in the push manner indicated in the first mode.

12. The first device according to claim 10, wherein the congestion status of the transmission port is determined based on a length of a data queue at the transmission port.

13. The first device according to claim 12, wherein the congestion status of the transmission port is determined based on a transmission rate of the data queue and the length of the data queue collected at a first sampling instant, wherein the transmission rate of the data queue is determined based on the length of the data queue collected at the first sampling instant and the length of the data queue collected at a second sampling instant, and wherein the second sampling instant takes precedence over the first sampling instant.

14. The first device according to claim 10, wherein the processor is further configured to record a mode identification information, wherein the mode identification information comprises an identification information corresponding to the transmission mode used when each of a plurality of second devices performs data transmission with the first device, so that the first device learns, based on the mode identification information, whether the indication information has been sent to a target device, wherein the target device is a device in the plurality of second devices.

15. A second device, wherein the second device comprises a processor and a transceiver, wherein the transceiver is configured to receive an indication information sent by a first device, wherein the indication information is used to instruct a second device to switch a transmission mode used when data is transmitted to the first device, the indication information is sent by the first device when a mode switching condition is met, the mode switching condition is associated with a congestion status of a transmission port, the transmission port is a communications port used by the first device when the second device transmits the data to the first device, and the congestion status is used to indicate whether data congestion occurs on the transmission port; and wherein the transceiver is configured to transmit the data to the first device in a switched transmission mode according to an instruction of the indication information, wherein the mode switching condition comprises the congestion status and a transmission mode prestored in the first device, wherein the mode switching condition is a first condition or a second condition, wherein the first condition comprises the congestion status indicating that data congestion occurs on the transmission port, and the transmission mode is a first mode that is used to instruct the second device to transmit the data to the first device in a push manner; and wherein the second condition comprises the congestion status indicating that data congestion does not occur on the transmission port, and the transmission mode is a second mode that is used to instruct the second device to transmit the data to the first device in a pull manner.

16. The second device according to claim 15, wherein if the mode switching condition is the first condition, the indication information is used to instruct the second device to switch the transmission mode from the first mode to the second mode, to transmit the data to the first device in the pull manner indicated in the second mode; or if the mode switching condition is the second condition, the indication information is used to instruct the second device to switch the transmission mode from the second mode to the first mode, to transmit the data to the first device in the push manner indicated in the first mode.

* * * * *